(12) United States Patent
Sakashita

(10) Patent No.: US 7,580,241 B2
(45) Date of Patent: *Aug. 25, 2009

(54) THIN FILM CAPACITOR ELEMENT COMPOSITION, HIGH PERMITTIVITY INSULATION FILM, THIN FILM CAPACITOR ELEMENT, THIN FILM MULTILAYER CAPACITOR, AND METHOD OF PRODUCTION OF THIN FILM CAPACITOR ELEMENT

(75) Inventor: Yukio Sakashita, Chigasaki (JP)

(73) Assignee: TDK Corporation, Tokyo (JP)

( * ) Notice: Subject to any disclaimer, the term of this patent is extended or adjusted under 35 U.S.C. 154(b) by 287 days.

This patent is subject to a terminal disclaimer.

(21) Appl. No.: 11/578,778

(22) PCT Filed: Apr. 26, 2005

(86) PCT No.: PCT/JP2005/007906

§ 371 (c)(1),
(2), (4) Date: Dec. 22, 2006

(87) PCT Pub. No.: WO2005/102958

PCT Pub. Date: Nov. 3, 2005

(65) Prior Publication Data

US 2007/0279838 A1    Dec. 6, 2007

(30) Foreign Application Priority Data

Apr. 26, 2004   (JP) .............................. 2004-129318

(51) Int. Cl.
*H01G 4/06* (2006.01)
(52) U.S. Cl. ...................... 361/313; 361/311; 361/312; 361/321.1; 361/321.2; 361/306.1

(58) Field of Classification Search ................. 361/313, 361/311–312, 303–305, 321.1, 321.2, 321.4, 361/306.1, 306.3
See application file for complete search history.

(56) References Cited

U.S. PATENT DOCUMENTS 5,471,363 A * 11/1995 Mihara ........................ 361/305

(Continued)

FOREIGN PATENT DOCUMENTS

EP   1 422 727 A1   5/2004

(Continued)

OTHER PUBLICATIONS

Zhu J. et al., "Study on Properties of Lanthanum Doped SrBi4Ti4O15 and Sr2Bi4Ti5O18 Ferroelectric Ceramics," 2003, Jpn. J. Appl. Phys., vol. 42, pp. 5165-5168.

(Continued)

*Primary Examiner*—Nguyen T Ha
(74) *Attorney, Agent, or Firm*—Oliff & Berridge, PLC

(57) ABSTRACT

A thin film capacitor element composition having a bismuth layered compound with a c-axis oriented substantially vertical to the substrate surface, wherein the bismuth layered compound is expressed by the formula $(Bi_2O_2)^{2+}(A_{m-1}B_mO_{3m+1})^{2-}$ or $Bi_2A_{m-1}B_mO_{3M+3}$, the symbol m in the formula is an odd number, at least part of the Bi and/or A of the bismuth layered compound is substituted by a rare earth element, and the number of moles substituted by the rare earth element is larger than 1.0 and 2.8 or less with respect to the number of moles (m+1) of the total of Bi and A.

22 Claims, 10 Drawing Sheets

U.S. PATENT DOCUMENTS

| | | | | |
|---|---|---|---|---|
| 6,437,380 | B1 * | 8/2002 | Lim et al. | 257/295 |
| 6,756,282 | B2 * | 6/2004 | Nagano et al. | 438/396 |
| 7,196,898 | B2 * | 3/2007 | Osaka et al. | 361/321.1 |
| 7,312,514 | B2 * | 12/2007 | Miyamoto et al. | 257/532 |
| 7,319,081 | B2 * | 1/2008 | Sakashita et al. | 501/134 |

FOREIGN PATENT DOCUMENTS

| | | |
|---|---|---|
| JP | A 56-144523 | 11/1981 |
| JP | A 05-335173 | 12/1993 |
| JP | A 05-335174 | 12/1993 |
| JP | A 08-253324 | 10/1996 |
| JP | A 10-158087 | 6/1998 |
| JP | A 11-214245 | 8/1999 |
| JP | A 2000-124056 | 4/2000 |
| JP | A 2003-002645 | 1/2003 |
| WO | WO 03/021606 A1 | 3/2003 |
| WO | WO 2004/065669 A1 | 8/2004 |

OTHER PUBLICATIONS

Aoyagi R. et al., "Crystal Growth and Characterization of Lanthanum Substituted Bismuth Titanate Single Crystals," 2001, Jpn. J. Appl. Phys., vol. 40, pp. 5671-5674.

Watanabe T. et al., "Site Definition and Characterization of La-Substituted Bi4Ti3O12 Thin Films Prepared by Metalorganic Chemical Vapor Deposition," 2001, Journal of Applied Physics, vol. 90, No. 12., pp. 6533-6535.

Armstrong R. et al., "Bismuth Titanate Solid Solutions," 1972, Mat. Res. Bull., vol. 7, pp. 1025-1034.

* cited by examiner

THIN FILM CAPACITOR ELEMENT COMPOSITION, HIGH PERMITTIVITY INSULATION FILM, THIN FILM CAPACITOR ELEMENT, THIN FILM MULTILAYER CAPACITOR, AND METHOD OF PRODUCTION OF THIN FILM CAPACITOR ELEMENT

TECHNICAL FIELD

The present invention relates to a thin film capacitor element composition, high permittivity insulation film, thin film capacitor element, thin film multilayer capacitor, and method of production of a thin film capacitor element.

BACKGROUND ART

In recent years, in the field of electronic devices, the higher densities and higher integration degrees of electronic circuits have led to a demand for further reductions in size and improvements in the performance of capacitor element as an essential circuit element in a variety of electronic circuits.

For example, thin film capacitors using single layer of dielectric thin film have been slow in being reduced in size in integrated circuits with transistors and other active elements and have become factors obstructing the realization of ultra-high integrated circuits. The delay in reducing the size of thin film capacitors is due to the low permittivity of the dielectric materials used for them. Therefore, to reduce the size of thin film capacitors and realize higher capacitances, use of dielectric materials with higher permittivity is important.

Further, in recent years, from the viewpoint of the capacitance density, the conventional $SiO_2$ and $Si_3N_4$ multilayer films are no longer sufficient for the capacitor materials for the next generation DRAMs (Gigabit generation), and material systems with higher permittivity have gathered attention. Among such material systems, use of TaOx ($\in$=up to 30) has mainly been studied, but other materials are also being actively developed.

On the other hand, as dielectric materials with relatively high permittivity, $(Ba,Sr)TiO_3$ (BST) and $Pb(Mg_{1/3}Nb_{2/3})O_3$ (PMN) are known.

Therefore, if using this type of dielectric material to form a thin film capacitor element, it should probably be possible to reduce the size.

However, when using this type of dielectric material, the reduction in thickness of the dielectric film leads to a drop in the permittivity. Further, reduction in thickness leads to the formation of holes in the dielectric film and thereby deterioration of the leakage characteristic and withstand voltage. Further, the formed dielectric film tends to be poor in surface flatness and poor in rate of change of the permittivity with respect to temperature. Note that in recent years, due to the environmental impact of PMN and another lead compounds, lead-free high capacitance capacitors have been desired.

As opposed to this, to realize a reduction in size and increase in capacitance of multilayer ceramic capacitors, it has been desired to reduce the thickness of each of the dielectric layers as much as possible and to increase the number of the dielectric layers in a predetermined size as much as possible.

However, for example, when using the sheet method (method of using a dielectric layer paste to form a dielectric green sheet layer on a carrier film by the doctor blade method etc., printing an internal electrode layer paste over this in a predetermined pattern, then peeling off and stacking one layer at a time) to produce a multilayer ceramic capacitor, the dielectric layers cannot be formed thinner than the ceramic material powder. Further, due to short-circuits caused by defects in the dielectric layers, breakage of the internal electrodes, or other problems, it has been difficult to reduce the dielectric layers in thickness to for example 2 μm or less. Further, when reducing the thickness of each of the dielectric layer, there were also limits to the number of layers. Note that there are similar problems when using the printing method (for example, the method of using the screen printing method to alternately print dielectric layer paste and internal electrode layer paste on a carrier film a plurality of times, then peeling off the carrier film) to produce a multilayer ceramic capacitor.

Due to such a reason, there were limits to the reduction of size and improvement of capacitance of multilayer ceramic capacitors. Therefore, various proposals have been made to solve this problem (for example, Patent Document 1, Patent Document 2, Patent Document 3, Patent Document 4, Patent Document 5, etc.)

These publications disclose methods of production of multilayer ceramic capacitors by using CVD, vapor deposition, sputtering, or other various types of thin film forming methods to alternately stack dielectric thin films and electrode thin films.

However, the dielectric thin films formed by the methods described in these publications are poor in surface flatness and, when overly stacked, suffer from electrode short-circuiting. Due to this, it was only possible to produce devices with at the most 12 to 13 layers. For this reason, even if the capacitor could be reduced in size, a higher capacitance could not be achieved.

Note that as shown in Non-Patent Document 1, the fact that a composition of the formula $(Bi_2O_2)^{2+}(A_{m-1}B_mO_{3m+1})^{2-}$ or $Bi_2A_{m-1}B_mO_{3m+3}$ where, in the formula, the symbol m indicates a positive integer of 1 to 8, the symbol A indicates at least one element selected from Na, K, Pb, Ba, Sr, Ca, and Bi, and the symbol B indicates at least one element selected from Fe, Co, Cr, Ga, Ti, Nb, Ta, Sb, V, Mo, and W forms a bulk bismuth layered compound dielectric obtained by the sintering method is itself known.

However, this publication did not disclose anything at all regarding under what conditions (for example, the relationship between the surface of the substrate and the c-axis orientation of the compound) the thickness is reduced (for example 1 μm or less) is it possible to obtain a relatively high permittivity and low loss even when thin and whether a thin film superior in leakage characteristic, improved in withstand voltage, superior in temperature characteristic of the permittivity, and superior in surface flatness can be obtained.

Therefore the inventors first developed and filed for thin film capacitor element compositions shown in the following Patent Document 6 and Patent Document 7. The inventors engaged in further experiments and as a result discovered that by including a predetermined amount of a rare earth element in a bismuth layered compound and lowering the Curie point, the frequency characteristic, bias characteristic, and dielectric loss can be improved and thereby completed the present invention.

Note that in a bismuth layered compound dielectric material, addition of lanthanum or another rare earth element has been a conventional practice. For example, use of MOCVD (abbreviation for metal-organic vapor deposition) or single crystal growth etc. to introduce a predetermined amount of lanthanum into a bismuth layered compound is shown in Non-Patent Document 2 and Non-Patent Document 3. Further, Non-Patent Document 4 shows the relationship between the lanthanum content and Curie point in a bismuth layered compound dielectric material.

The content of lanthanum in the bismuth layered compound dielectric described in these publications was, in Non-Patent Document 2, x=0.2 to 0.9 in range in $Bi_{4-x}La_xTi_3O_{12}$, in Non-Patent Document 3, x=0.25 to 0.75 in range in $Bi_{4-x}La_xTi_3O_{12}$, and, in Non-Patent Document 4, x=0.10 to 1.00 in range in $SrBi_{4-x}La_xTi_4O_{15}$ and x=0.05 to 0.75 in range in $Sr_2Bi_{4-x}La_xTi_5O_{18}$. Further, with the methods of production of the bismuth layered compound dielectric materials described in these publications (for example, MOCVD and single crystal growth), introduction of lanthanum (rare earth element) in a content of more than that described in the publications is difficult.

Patent Document 1: Japanese Patent Publication (A) No. 2000-124056

Patent Document 2: Japanese Patent Publication (A) No. 11-214245

Patent Document 3: Japanese Patent Publication (A) No. 56-144523

Patent Document 4: Japanese Patent Publication (A) No. 5-335173

Patent Document 5: Japanese Patent Publication (A) No. 5-335174

Patent Document 6: PCT/JP02/08574

Patent Document 7: Japanese Patent Application No. 2003-12086

Non-Patent Document 1: "Grain Orientation of Ferroelectric Ceramics having Bismuth Layered Structure and Application Thereof to Piezoelectric and Pyroelectric Materials", Takenaka, Tadashi, Kyoto University Doctoral Thesis (1984), Chapter 3, pp. 23 to 77

Non-Patent Document 2: Takayuki Watanabe and three others, "Site definition and characterization of La-substituted $Bi_4Ti_3O_{12}$ thin films prepared by metal organic chemical vapor deposition", Journal of Applied Physics, Dec. 15, 2001, vol. 90, no. 12, p. 6533-6535

Non-Patent Document 3: Rintaro Aoyagi and three others, "Crystal Growth and Characterization of Lathanum Substituted Bismuth Titanate Single Crystal", Japanese Journal of Applied Physics, September 2001, vol. 40, no. 9B, p. 5671-5674

Non-Patent Document 4: Jun Zhu and four others, "Study on Properties of Lathanum Doped $SrBi_4Ti_3O_{15}$ Ferroelectric Ceramics", Japanese Journal of Applied Physics, August 2003, vol. 42, no. 8, p. 5165-5168

DISCLOSURE OF INVENTION

Problem to be Solved by the Invention

An object of the present invention is to provide a thin film capacitor element composition having a high c-axis orientation, in particular a low Curie point, and superior frequency characteristic, bias characteristic, and dielectric loss or other electrical characteristics and a high permittivity insulation film, thin film capacitor element, thin film multilayer capacitor, and method of production of a thin film capacitor element using the same. Another object of the present invention is to produce a thin film capacitor element low in Curie point and superior in electrical characteristics in particular by formation by the solution method.

Means for Solving the Problem

The inventors engaged in intensive studies on the materials and crystal structures of dielectric thin films used for capacitors and as a result discovered that by using a specific composition of a bismuth layered compound and orienting the c-axis ([001] orientation) of the bismuth layered compound vertical to the substrate surface to form a dielectric thin film as a thin film capacitor element composition, that is, by forming a c-axis oriented film (thin film normal parallel to c-axis) of a bismuth layered compound with respect to the substrate surface, it is possible to impart a relatively high permittivity and low loss (low tan δ) even when thin and provide a thin film capacitor element composition superior in leakage characteristic, improved in withstand voltage, superior in temperature characteristic of the permittivity, and superior in surface flatness as well and a thin film capacitor element using the same. Further, by using such a thin film capacitor element composition as a dielectric thin film, it is possible to increase the number of layers and provide a thin film multilayer capacitor small in size and able to give a relatively high capacitance and thereby completed the present invention. Further, they discovered that by using such a composition as a high permittivity insulation film, use for applications other than a thin film capacitor element is also possible and thereby completed the present invention.

Further, the inventors discovered that by introducing a rare earth element in a predetermined amount into a bismuth layered compound, a thin film capacitor element composition low in Curie point and superior in frequency characteristic, bias characteristic, dielectric loss, or other electrical characteristics can be obtained and thereby completed the present invention.

That is, the thin film capacitor element composition of the present invention is a thin film capacitor element composition having a bismuth layered compound with a c-axis oriented substantially vertical to the substrate surface, wherein the bismuth layered compound is expressed by the formula $(Bi_2O_2)^{2+}(A_{m-1}B_mO_{3m+1})^{2-}$ or $Bi_2A_{m-1}B_mO_{3m+3}$, wherein a symbol m indicates an odd number, a symbol A indicates at least one element selected from Na, K, Pb, Ba, Sr, Ca, and Bi, and a symbol B indicates at least one element selected from Fe, Co, Cr, Ga, Ti, Nb, Ta, Sb, V, Mo, and W, at least part of the Bi and/or A of the bismuth layered compound is substituted by a rare earth element (at least one element selected from Sc, Y, La, Ce, Pr, Nd, Pm, Sm, Eu, Gd, Tb, Dy, Ho, Er, Tm, Yb, and Lu), and the number of moles substituted by the rare earth element with respect to the number of moles (m+1) of the total of Bi and A is larger than 1.0 and 2.8 or less.

Preferably, the number of moles substituted by the rare earth element is 1.1 to 2.5, more preferably 1.25 to 2.4, with respect to the number of moles (m+1) of the total of Bi and A.

In the present invention, "the number of moles substituted by the rare earth element" means the number of moles with respect to the number of moles (m+1) of the total of Bi and A, but the total the number of moles of Bi and A indicates the number of moles in the state not substituted by a rare earth element. For example, when expressing the rare earth element as Re and the bismuth layered compound is the formula $(Bi_2O_2)^{2+}(A_{m-1}B_mO_{3m+1})^{2-}$ where m=3, that is $Bi_2Re_2B_3O_{12}$, the number of moles of the total of Bi and A (m+1; m=3) is 4 and the number of moles substituted by a rare earth element is 2. Further, the same is true for the formula $Bi_2A_{m-1}B_mO_{3m+3}$ where m=3, that is, $Bi_2Re_2B_3O_{12}$.

Further, in the present invention, the rare earth element is mainly included in the bismuth layered compound in the form of substituting the Bi and/or A of the bismuth layered compound, that is, by substituting the Bi site and/or A site, but it may also be included by substituting another site, for example, the B site.

In the thin film capacitor element composition according to the present invention, preferably the Bi of the bismuth layered compound is contained in excess with respect to the formula $(Bi_2O_2)^{2+}(A_{m-1}B_mO_{3m+1})^{2-}$ or $Bi_2A_{m-1}B_mO_{3m+3}$ and the excess content of the Bi, converted to Bi, is 0<Bi<0.6×m moles in range, more preferably $0.1 \leq Bi<0.6\times m$ moles, furthermore preferably $0.1 \leq Bi<0.5\times m$ moles in range.

In the present invention, by having the Bi of the bismuth layered compound included in excess in the thin film capacitor element composition by a predetermined excess content with respect to the stoichiometric composition of the bismuth layered compound, the c-axis orientation can be further improved.

The "thin film" referred to in the present invention means a film of a material of a thickness of several Å to several μm or so formed by various types of thin film forming methods and excludes a bulk of a thick film of a thickness of several hundred μm or more formed by the sintering method. The thin film includes not only a continuous film continuously covering a predetermined region, but also a discontinuous film intermittently covering it at any interval. The thin film may be formed at part of the substrate surface or formed at the entire surface.

The thin film capacitor element composition is not particularly limited, but a condenser use dielectric thin film composition or a capacitor use dielectric thin film composition etc. may be mentioned.

In the thin film capacitor element composition according to the present invention, preferably the m in the formula is m=3.

In the thin film capacitor element composition according to the present invention, preferably when the rare earth element is Re and the bismuth layered compound is expressed as $Bi_{4-x}Re_xTi_3O_{12}$, the x is $1<x\leq 2.8$, more preferably $1.1 \leq x \leq 2.5$, furthermore preferably $1.25 \leq x \leq 2.4$.

Alternatively, in the thin film capacitor element composition according to the present invention, preferably the m in the formula is m=5.

In the thin film capacitor element composition according to the present invention, preferably when the rare earth element is Re and the bismuth layered compound is expressed as $Bi_{4-x}A_2Re_xTi_5O_{18}$, the x is $1<x\leq 2.8$, more preferably $1.1 \leq x \leq 2.5$, furthermore preferably $1.25 \leq x \leq 2.4$.

In the thin film capacitor element composition according to the present invention, preferably the rare earth element is at least one element selected from La, Ce, Pr, Nd, Pm, Sm, Eu, and Gd.

In the present invention, the c-axis of the bismuth layered compound being substantively 100% oriented vertical to the substrate surface, that is, the c-axis orientation of the bismuth layered compound being 100%, is particularly preferable, but the c-axis orientation does not necessarily have to be 100%.

Preferably, the c-axis orientation of the bismuth layered compound is 50% or more, more preferably 55% or more, particularly preferably 60% or more. By improving the c-axis orientation, the action and effect of the present invention are improved.

Further, the thin film capacitor element composition according to the present invention can give a relatively high permittivity even if thin and is good in surface flatness, so it is possible to increase the number of layers of the dielectric thin film of the thin film capacitor element composition. Therefore, if using such a thin film capacitor element composition, a thin film capacitor which is small in size and can give a relatively high capacitance can be provided.

The thin film capacitor element according to the present invention is a thin film capacitor element comprised of a substrate on which a lower portion electrode, dielectric thin film, and upper portion electrode are successively formed, wherein the dielectric thin film is comprised of any of the above thin film capacitor element compositions.

The thin film capacitor element is not particularly limited, but a capacitor having a conductor-insulator-conductor structure (for example, a single layer type thin film capacitor or multilayer type thin film multilayer capacitor etc.) or other capacitor (for example, for a DRAM etc.) etc. may be mentioned.

Preferably, the dielectric thin film has a thickness of 1 to 1000 nm, more preferably 10 to 500 nm. In the case of such a thickness, the present invention is large in action and effect.

The thin film multilayer capacitor according to the present invention is a thin film multilayer capacitor comprised of a substrate on which a dielectric thin film and internal electrode thin film are alternately stacked in a plurality of layers, wherein the dielectric thin film is comprised of any of the above thin film capacitor element compositions.

Preferably, the dielectric thin film has a thickness of 1 to 1000 nm, more preferably 10 to 500 nm. In the case of such a thickness, the present invention is large in action and effect.

The high permittivity insulation film according to the present invention is a high permittivity insulation film having a bismuth layered compound with a c-axis oriented substantially vertical to the substrate surface, wherein the bismuth layered compound is comprised of any of the above thin film capacitor element compositions.

The high permittivity insulation film according to the present invention is comprised of a composition the same as the thin film capacitor element composition according to the present invention. The high permittivity insulation film of the present invention may be used not only as a thin film dielectric film of a thin film capacitor element or other capacitor, but also for example a gate insulation film of a semiconductor device, an intermediate insulation film between a gate electrode and floating gate, etc.

The method of production of a thin film capacitor element according to the present invention comprises a coating step of coating a solution for forming the thin film capacitor element composition on the surface of the lower portion electrode to form a coated film when forming the dielectric thin film on the lower portion electrode and a firing step of firing the coated film on the lower portion electrode to obtain a dielectric thin film.

Preferably, after forming the coated film on a surface of the lower portion electrode, the coated film is dried, then, calcining is performed on the coating film at a temperature of not crystallizing the coated film and, then, the coated film is fired.

Alternatively, after drying the coated film, steps of forming still another coated film on the dried coated film and drying the coated film may be repeated to obtain a coated film having a desired thickness and, then, the coated film is fired. Note that in this case, the method may also repeat the coating and drying at least once, then calcine, then fire it.

Alternatively, after drying and performing calcining on the coated film, steps of forming still another coated film on the calcined coated film and drying and performing calcining on the coated film may be repeated to obtain a coated film having a desired thickness and, then, the coated film is fired. Note that in this case it is also possible to repeat the coating and calcining omitting the drying, then fire the result.

Alternatively, steps of drying said coated film, performing calcining and, then, firing may be repeated to obtain a coated film having a desired thickness. Note that in this case, it is also possible to repeat the coating, calcining, and firing while omitting the drying or to repeat the coating, drying, and firing while omitting the calcining.

Preferably, the temperature for firing the coated film is 500 to 1000° C. which is crystallization temperature of the coated film.

Preferably, the temperature for drying the coated film is room temperature (25° C.) to 400° C.

Preferably, the temperature for calcining the coated film is 200 to 700° C.

Preferably, the method repeats the coating, drying, and/or calcining so that the thickness of the unfired coated film before firing becomes 200 nm or less, preferably 10 to 200 nm, in terms of the thickness after firing. If the coated film before firing is too thick, a well crystallized c-axis oriented bismuth layered compound film tends to become difficult to obtain after firing. Further, if it is too thin, to obtain a dielectric thin film of the desired thickness, it is necessary to repeat the firing a large number of times. This is not economical.

Preferably, the method forms the dielectric thin film, then forms the upper portion electrode on the dielectric thin film, then heat treats the assembly at $pO_2$=20 to 100% (oxygen partial pressure). The temperature at the time of heat treatment is preferably 400 to 1000° C.

With the method of production of a capacitor element according to the present invention, even if employing the chemical solution method, regardless of the direction of orientation of the substrate, a thin film capacitor element having a dielectric thin film with a high c-axis orientation and a superior leak current resistance characteristic can be produced extremely easily. Further, with the method of production of the present invention, a relatively thick dielectric thin film can be easily formed.

EFFECTS OF THE INVENTION

According to the present invention, a thin film capacitor element composition high in c-axis orientation, in particular low in Curie point, and superior in frequency characteristic, bias characteristic, and dielectric loss or other electrical characteristics and a high permittivity insulation film, thin film capacitor element, thin film multilayer capacitor, and method of production of a thin film capacitor element using the same can be provided. Further, in the present invention, in particular by formation by the solution method, a thin film capacitor element having a dielectric thin film high in c-axis orientation, in particular low in Curie point and superior in electrical characteristics, can be easily produced.

BEST MODE FOR WORKING THE INVENTION

Figure 1A:
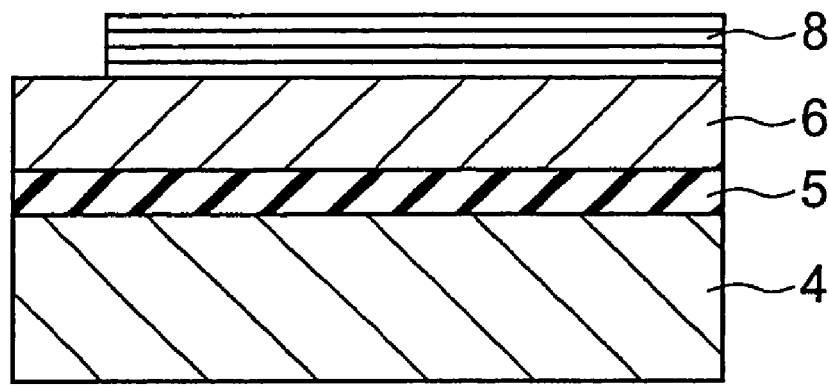
FIG. 1A is a schematic cross-sectional view showing the process of production of a thin film capacitor according to an embodiment of the present invention.

Below, the present invention will be explained based on embodiments shown in the drawings.

First Embodiment

In this embodiment, as the thin film capacitor element, a thin film capacitor forming a dielectric thin film by a single layer will be used as an example for the explanation.

Figure 1B:
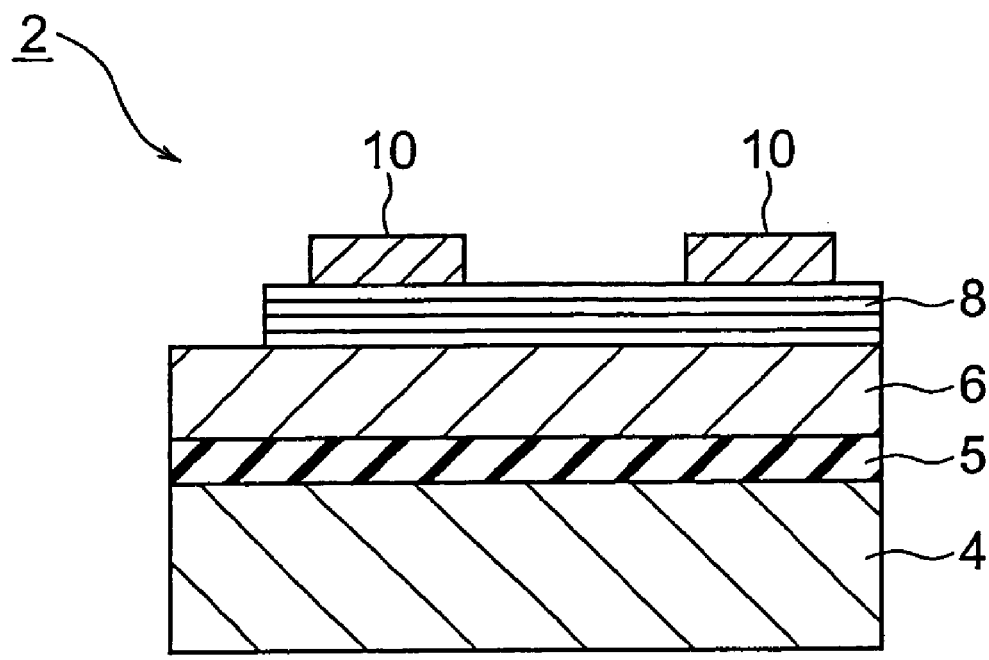
FIG. 1B is a schematic cross-sectional view showing the process of production of a thin film capacitor following FIG. 1A.

As shown in FIG. 1A and FIG. 1B, the thin film capacitor 2 according to an embodiment of the present invention has a substrate 4 and a lower portion electrode thin film 6 over this substrate 4 through an insulation layer 5. The lower portion electrode thin film 6 is formed over it with a dielectric thin film 8. The dielectric thin film 8 is formed over it with an upper portion electrode thin film 10. Note that in this embodiment, an insulation layer 5 is preferably formed over the substrate 4, but there is no absolute need to form the insulation layer 5. For example, the substrate 4 may have the lower portion electrode thin film 6 directly formed over it.

The substrate 4 and insulation layer 5 are not particularly limited, but are comprised of a good lattice matching single crystal (for example, $SrTiO_3$ single crystal, MgO single crystal, $LaAlO_3$ single crystal, etc.), an amorphous material (for example, glass, fused quartz, $SiO_2$/Si, etc.), a ceramic substrate, glass-ceramic substrate, or other material (for example, $ZrO_2$/Si, $CeO_2$/Si, etc.) The substrate 4 is not particularly limited in thickness and is for example 100 to 1000 µm or so.

In this embodiment, as the substrate 4, a silicon single crystal substrate is used. An insulation layer 5 comprised of a thermal oxide film (silicon oxide film) is formed on its surface, while a lower portion electrode thin film 6 is formed on that surface. If using the present invention, when using a lower portion electrode oriented in the [100] direction of course and even when using an amorphous, nonoriented, or other than [100] direction oriented electrode, a c-axis oriented dielectric film can be extremely easily produced.

The lower portion electrode thin film 6 when using a single crystal with a good lattice match for the substrate 4, for example, is preferably comprised of $CaRuO_3$ or $SrRuO_3$ or another conductive oxide or Pt or Ru or another precious metal, more preferably a conductive oxide or precious metal oriented in the [100] direction. If using a substrate 4 oriented in the [100] direction, it is possible to form a conductive oxide or precious metal oriented in the [100] direction on its surface. By making the lower portion electrode thin film 6 a conductive oxide or precious metal oriented in the [100] direction, the orientation ability in the [001] direction of the dielectric thin film 8 formed on the lower portion electrode thin film 6, that is, the c-axis orientation ability, is improved. Such a lower portion electrode thin film 6 is produced by the usual thin film forming method, but for example in sputtering or the pulse laser deposition (PLD) or other physical vapor deposition, the temperature of the substrate 4 on which the lower portion electrode thin film 6 is formed is preferably 300° C. or more, more preferably 500° C. or more.

The lower portion electrode thin film 6 when using an amorphous material for the substrate 4 may for example be made of ITO or another conductive glass. When using a single crystal with a good lattice match for the substrate 4, formation of a lower portion electrode thin film 6 oriented in the [100] direction on the surface is easy. Due to this, the c-axis orientation ability of the dielectric thin film 8 formed on the lower portion electrode thin film 6 is easily improved. However, even if using glass or another amorphous material for the substrate 4, a dielectric thin film 8 improved in c-axis orientation ability may be used. In this case, the film forming conditions of the dielectric thin film 8 have to be optimized.

As other lower portion electrode thin film 6, for example, gold (Au), palladium (Pd), silver (Ag), or other precious metals or their alloys and also nickel (Ni), copper (Cu), or other base metals or their alloys may be used.

The lower portion electrode thin film 6 is not particularly limited in thickness, but preferably is 10 to 1000 nm, more preferably 50 to 200 nm or so.

The upper portion electrode thin film 10 may be formed by a material similar to the lower portion electrode thin film 6. Further, the thickness may also be similar.

The dielectric thin film 8 is formed by the thin film capacitor element composition of the present invention.

The thin film capacitor element composition of the present invention contains a bismuth layered compound expressed by the formula $(Bi_2O_2)^{2+}(A_{m-1}B_mO_{3m+1})^{2-}$ or $Bi_2A_{m-1}B_mO_{3m+3}$. In general, a bismuth layered compound exhibits a layered structure of a lamellar perovskite layer of connected perovskite lattices comprised of (m−1) number of $ABO_3$ sandwiched above and below by a pair of Bi and O layers.

In the formula, the symbol m indicates an odd number. If the symbol m is an odd number, there is a polarization axis in the c-axis direction as well and the permittivity at the Curie point rises compared with the case where m is an even number. Note that temperature characteristic of the permittivity tends to deteriorate more than when the m is an even number, but a better characteristic is exhibited compared with the conventional BST.

In the formula, the symbol A indicates at least one element selected from Na, K, Pb, Ba, Sr, Ca, and Bi. Note that when the symbol A indicates two or more elements, they may be in any ratio.

In the formula, the symbol B indicates at least one element selected from Fe, Co, Cr, Ga, Ti, Nb, Ta, Sb, V, Mo, and W. Note that when the symbol B indicates two or more elements, they may be in any ratio.

In the present embodiment, at least part of the Bi and/or A of the bismuth layered compound is substituted by a rare earth element. The rare earth element is not particularly limited so long as it is at least one element selected from Sc, Y, La, Ce, Pr, Nd, Pm, Sm, Eu, Gd, Tb, Dy, Ho, Er, Tm, Yb, and Lu, but preferably is at least one element selected from La, Ce, Pr, Nd, Pm, Sm, Eu, and Gd, more preferably La, Ce, Pr, Nd, Pm, and Sm.

The amount of substitution by a rare earth element in the bismuth layered compound is, in terms of the number of moles substituted by a rare earth element with respect to the number of moles (m+1) of the total of Bi and A, larger than 1 and 2.8 or less, preferably 1.1 to 2.5, more preferably 1.25 to 2.4. In the present invention, the number of moles substituted by the rare earth element means the number of moles with respect to the number of moles (m+1) of the total of Bi and A, but the number of moles of the total of Bi and A shows the number of moles in the state not substituted by any rare earth element. If the number of moles substituted by a rare earth element is 1 or less, the content of the rare earth element is too small and the effect of the present invention tends to no longer be obtained. Further, the upper limit of the number of moles substituted, considering the solution limit of rare earth elements, is preferably 2.8 or less.

In the present embodiment, by making the content of rare earth elements in the bismuth layered compound above range, the thin film capacitor element composition forming the dielectric thin film 8 can be lowered in Curie point. By lowering the Curie point, the frequency characteristic, bias characteristic, and dielectric loss can be improved.

Further, in the present embodiment, by making the content of the rare earth element of the bismuth layered compound one within the above range and making it a specific composition, the thin film capacitor element composition can be reduced in Curie point to room temperature or less. By reducing the Curie point of the thin film capacitor element composition to room temperature or less, the thin film capacitor element composition can be made paraelectric at room temperature. Note that to make the Curie point of the thin film capacitor element composition room temperature or less in this way, the number of moles substituted by a rare earth element is particularly preferably made 1.1 to 2.5.

In the formula, preferably the symbol m is m=3 or m=5.

When m=3, the bismuth layered compound is a compound expressed by the formula $Bi_{4-x}Re_xTi_3O_{12}$ (where Re is a rare earth element). The symbol x in the formula is preferably made $1<x\leq2.8$. The symbol x in the formula is more preferably $1.1\leq x\leq2.5$, furthermore preferably $1.25\leq x\leq2.4$.

When m=5, the bismuth layered compound is a compound expressed by the formula $Bi_{4-x}A_2Re_xTi_5O_{18}$ (where Re is a rare earth element). The symbol x in the formula is preferably made $1<x\leq2.8$. The symbol x in the formula is more preferably $1.1\leq x\leq2.5$, furthermore preferably $1.25\leq x\leq2.4$.

In the present embodiment, the Bi of the bismuth layered compound is preferably contained in excess with respect to the formula $(Bi_2O_2)^{2+}(A_{m-1}B_mO_{3m+1})^{2-}$ or $Bi_2A_{m-1}B_mO_{3m+3}$. The excess content of Bi is, converted to Bi, preferably $0<Bi<0.6\times m$ moles in range, more preferably $0.1\leq Bi<0.6\times m$ moles, furthermore preferably $0.1\leq Bi<0.5\times m$ moles in range.

For example, in the case of a bismuth layered compound where m in the formula is 3, the excess content of Bi is, converted to Bi, $0<Bi<1.8(0.6\times3(m))$ moles in range.

In the present embodiment, by including bismuth in excess with respect to the stoichiochemical composition in this way, the orientation ability of the bismuth layered compound in the [001] direction, that is, the c-axis orientation ability, is improved. That is, the dielectric thin film 8 is formed so that the c-axis of the bismuth layered compound is oriented substantially vertical to the substrate 4.

In the present invention, the c-axis orientation of the bismuth layered compound is particularly preferably 100%, but the c-axis orientation does not necessarily have to be 100%. It is sufficient that preferably 50% or more of the bismuth layered compound, more preferably 55% or more, furthermore preferably 60% or more, have such a c-axis orientation. For example, when using a substrate 4 made of glass or another amorphous material and giving the bismuth layered compound a c-axis orientation, the c-axis orientation of the bismuth layered compound is preferably 50% or more. Further, when using the later explained various types of thin film forming methods to give a c-axis orientation to the bismuth layered compound, the c-axis orientation of the bismuth layered compound is preferably 55% or more, more preferably 60% or more.

The "c-axis orientation of the bismuth layered compound (F)" referred to here is found by $F(\%)=\{(P-P0)/(1-P0)\}\times 100$ . . . (equation 1) where the c-axis diffraction intensity ratio of a polycrystalline body with a completely random orientation is P0 and the actual c-axis diffraction intensity ratio is P. The P in equation 1 is the ratio ($\{\Sigma I(001)/\Sigma I(hkl)\}$) of the total $\Sigma I(001)$ of the reflection intensity $I(001)$ from the (001) plane and the total $\Sigma I(hkl)$ of the reflection intensities $I(hkl)$ from the different crystal planes (hkl). The same is true for P0. However, in equation 1, the X-ray diffraction intensity P in the case of 100% orientation in the c-axis direction is "1". Further, from equation 1, when completely randomly oriented (P=P0), F=0%, while when completely oriented in the c-axis direction (P=1), F=100%.

Note that the "c-axis" of the bismuth layered compound means the direction connecting a pair of $(Bi_2O_2)^{2+}$ layers, that is, the [001] direction. By giving the bismuth layered compound such a c-axis orientation, the dielectric characteristic of the dielectric thin film 8 can be obtained at a maximum extent. That is, the dielectric thin film 8 is relatively high in permittivity, is low in loss (low tan δ), is superior in leakage characteristic, is improved in withstand voltage, is superior in the temperature characteristic of the permittivity, and is superior in the surface flatness. If the tan δ is reduced, the value of the loss Q (1/tan δ) improves.

Note that in the present embodiment, the Bi of the bismuth layered compound is preferably included in this range of excess, but even if not including Bi in excess, the effect of the present invention can be obtained.

The dielectric thin film 8 preferably has a thickness of 1 to 1000 nm. From the viewpoint of increasing the capacitance, it is more preferably 1 to 500 nm.

Such a dielectric thin film 8 may be formed by using vacuum deposition, high frequency sputtering, pulse laser deposition (PLD), MOCVD (Metal Organic Chemical Vapor Deposition), the sol gel method, or other various types of thin film forming methods, but for the following reasons production by the solution method is preferable.

The dielectric thin film 8 of this embodiment is made of the thin film capacitor element composition of the present invention, but the thin film capacitor element composition of the present invention includes a relatively large amount of rare-earth elements. For this reason, with the for example above explained vacuum deposition, high frequency sputtering, pulse laser deposition (PLD), MOCVD, or other gas phase method, film formation with a good reproducibility of the composition and not deviating in composition is generally difficult. Further, even when using single crystal growth, production of a thin film capacitor element composition containing a relatively large amount of rare earth elements is similarly difficult. For this reason, the dielectric thin film 8 of the present embodiment is particularly preferably produced by the method shown below (solution method).

Figure 2:
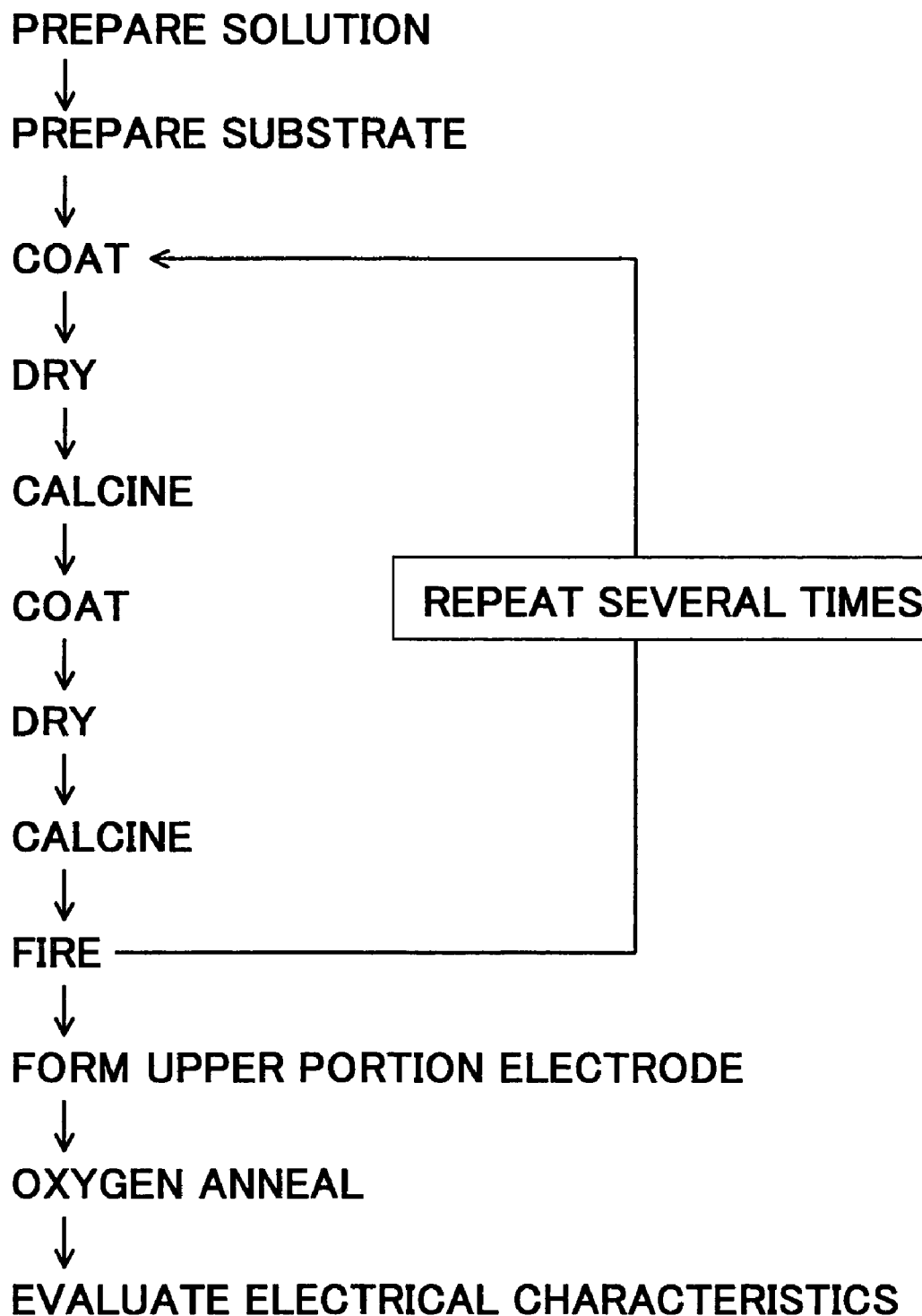
FIG. 2 is a flow chart showing the process of production of a thin film capacitor shown in FIG. 1A and FIG. 1B.

As shown in FIG. 2, first, a stock solution for forming the dielectric thin film 8 shown in FIG. 1A is prepared. When the dielectric thin film 8 is for example expressed by the formula $Bi_{4+\alpha}Ti_3O_{12}$, bismuth 2-ethylhexanoate in a 2-ethylhexanoic acid solution and titanium 2-ethylhexanoate in a toluene solution are prepared. That is, it is possible to mix these two solutions so that the amount of addition of Bi becomes greater by α moles compared with when mixing by the stoichiochemical ratio as with the bismuth 2-ethylhexanoate in an amount of (4+α) moles and the titanium 2-ethylhexanoate in 3 moles and to dilute the mixture by toluene to obtain the stock solution.

Next, this stock solution is coated on the lower portion electrode 6 shown in FIG. 1A. The coating method is not particularly limited. Spin coating, dipping, spraying, brushing, or other method may be used. A single coating operation enables for example 5 to 600 nm or so of a coated film to be formed. This coated film, as shown in FIG. 2, is made to dry in the air by evaporation of the solvent in the coated film. The drying temperature is room temperature to 400° C. or so.

Next, this dried coated film is calcined (without crystallization) under an oxygen atmosphere. The calcining temperature is 200 to 700° C. or so.

Next, as shown in FIG. 2, the calcined coated film is again subjected to the process from coating to calcining at least once. Note that if the unfired coated film is too great in thickness before firing, it tends to become difficult to obtain a well crystallized c-axis oriented bismuth layered compound film after firing.

After this, the coated film is substantively fired (also simply called "fired"). The firing is conducted at a temperature under conditions where the coated film will crystallize. The temperature is preferably 400 to 1000° C. The atmosphere at the time of firing is not particularly limited, but may be an oxygen gas atmosphere.

Note that when including a relatively large amount of rare earth elements in the thin film capacitor element composition forming the dielectric thin film 8 like in the present invention, compared with not including any rare earth elements or including them but in a relatively small amount, firing at a high temperature is preferable. When firing at a relatively high temperature in this way, the firing tends to cause the Bi to easily be evaporated away, so the amount of excess Bi added is preferably made somewhat extra large.

Next, as shown in FIG. 2, by repeating the firing after the repeated coating and calcining at least one time, it is possible to obtain a dielectric thin film 8 having a final thickness of 1 to 1000 nm or so. At the time of this firing, the thickness of the unfired coated film at the time of one firing operation is preferably set so as to become a thickness of 200 nm or less after firing, preferably 10 to 200 nm. If the thickness of the coated film before firing is too great, it tends to be difficult to obtain a well crystallized c-axis oriented bismuth layered compound film after firing. Further, if too thin, the firing operation has to be repeated a large number of times to obtain the desired thickness of the dielectric thin film. This is not economical.

The thus obtained dielectric thin film 8 is comprised of the bismuth layered compound containing bismuth in excess. The c-axis is oriented substantially vertical to the substrate 4. The c-axis orientation of the bismuth layered compound is preferably 50% or more, more preferably 55% or more, furthermore preferably 60% or more.

After this, as shown in FIG. 1B, the sputtering method etc. is used to form the upper portion electrode 10 and the assembly is heat treated at $pO_2$=20 to 100%. This heat treatment is preferably performed at a temperature of 400 to 1000° C.

Such a dielectric thin film 8 and a thin film capacitor 2 using the same are relatively high in permittivity, low in loss, superior in leakage characteristic, improved in withstand voltage, superior in temperature characteristic of the permittivity, and superior in surface flatness.

Further, such a dielectric thin film 8 and thin film capacitor 2 are superior in frequency characteristic and voltage characteristic.

Second Embodiment

In the present embodiment, as the thin film capacitor element, a thin film multilayer capacitor formed with multiple layers of dielectric thin film is explained as an example.

Figure 3:
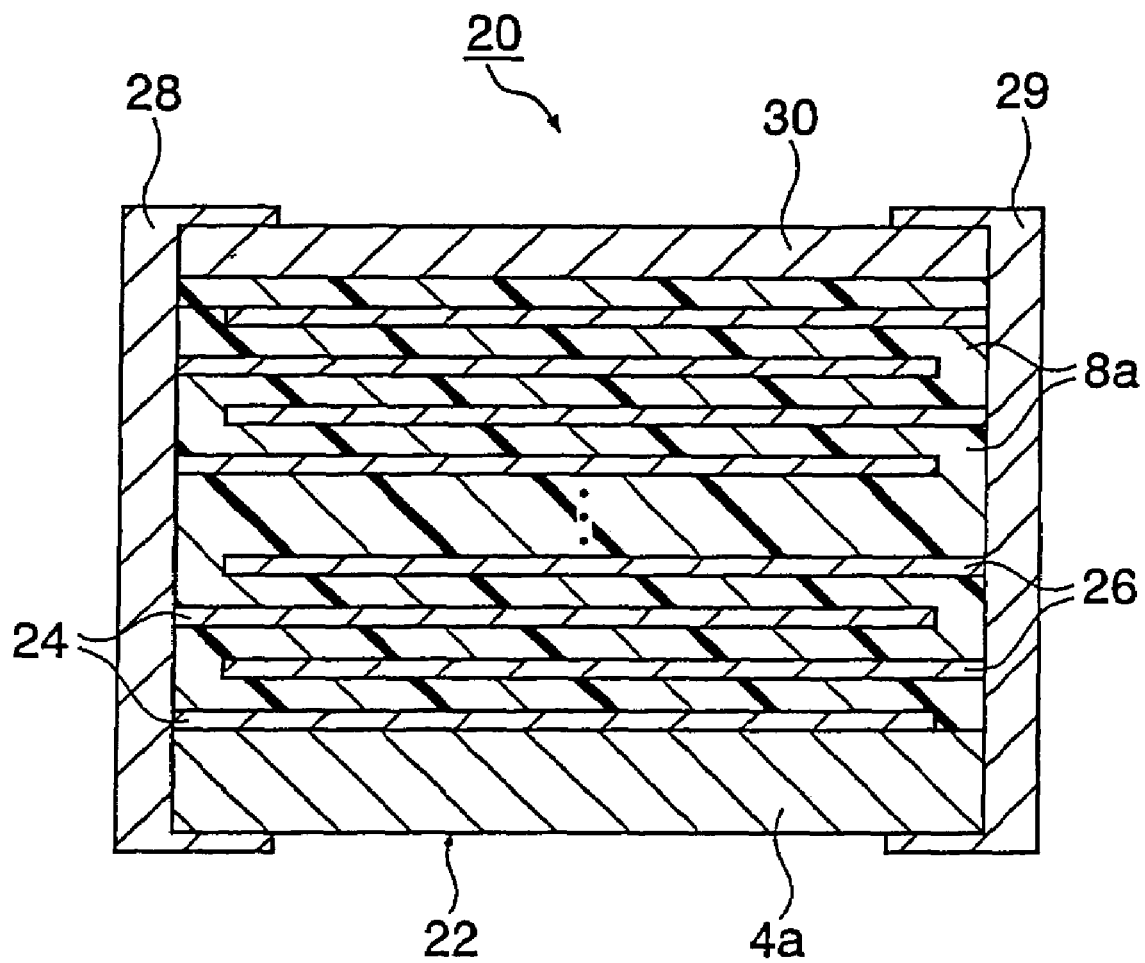
FIG. 3 is a schematic cross-sectional view of a thin film multilayer capacitor according to another embodiment of the present invention.

As shown in FIG. 3, the thin film multilayer capacitor 20 according to an embodiment of the present invention has a capacitor body 22. The capacitor body 22 is comprised of a substrate 4a on which a dielectric thin film 8a and internal electrode thin films 24, 26 are alternately stacked in a plurality of layers and further formed with a protective layer 30 so as to cover the dielectric thin film 8a positioned at the outermost part thereby forming a multilayer structure. The capacitor body 22 is formed at its two ends with a pair of external electrodes 28 and 29. The pair of external electrodes 28, 29 are electrically connected to the exposed end faces of the internal electrode thin films 24, 26 alternately arranged inside the capacitor body 22 to form a capacitor circuit. The capacitor body 22 is not particularly limited in shape, but usually is made a rectangular parallelopiped. Further, the dimensions are not particularly limited, but for example are a length of (0.01 to 10 mm)×width of (0.01 to 10 mm)×height of (0.01 to 1 mm) or so.

The substrate 4a is made of the same material as the substrate 4 of the above first embodiment. The dielectric thin film 8a is made of the same material as the dielectric thin film 8 of the first embodiment.

The internal electrode thin films 24, 26 are made of the same materials as the lower portion electrode thin film 6 and the upper portion electrode thin film 10 of the first embodiment. The materials of the external electrodes 28, 29 are not particularly limited and may be $CaRuO_3$ or $SrRuO_3$ or another conductive oxide; Cu or a Cu alloy or Ni or an Ni alloy or other base metal; Pt, Ag, Pd, or an Ag—Pd alloy or other precious metal; etc. The thickness is not particularly limited, but for example should be 10 to 1000 nm or so. The material of the protective layer 30 is not particularly limited, but for example may be a silicon oxide film, aluminum oxide film, etc.

The thin film multilayer capacitor 20 is obtained by applying a for example metal mask or other mask on the substrate 4a to form a first internal electrode thin film 24, then forming a dielectric thin film 8a on this internal electrode thin film 24, and forming a second internal electrode thin film 26 on this dielectric thin film 8a. This process is repeated a plurality of times, then the dielectric thin film 8a arranged at the outermost part at the opposite side to the substrate 4a is covered by a protective film 30, whereby a capacitor body 22 comprised of the substrate 4a on which the internal electrode thin films 24, 26 and a dielectric thin film 8a are alternately arranged in a plurality of layers is formed. By covering this by the protective film 30, the influence of moisture in the atmosphere on the inside of the capacitor body 22 can be reduced. Further, forming external electrodes 28, 29 on the two ends of the capacitor body 22 by dipping or sputtering etc., the odd number layer internal electrode thin films 24 will be electrically connected electrically to the external electrode 28 while the even number layer internal electrode thin films 26 will be electrically connected to the external electrode 29 thereby obtaining a thin film multilayer capacitor 20.

In the present embodiment, from the viewpoint of reducing the production costs, it is more preferable to use a substrate 4a made of an amorphous material.

The dielectric thin film 8a used in this embodiment is relatively high in permittivity even if thin and further is good in surface flatness, so the number of layers can be made 20 layers or more, preferably 50 layers or more. Therefore, it is possible to provide a thin film multilayer capacitor 20 which is small in size and relatively high in capacitance.

Note that the present invention is not limited to the above embodiments and may be changed in various ways within the scope of the present invention.

EXAMPLES

Below, the present invention will be explained with reference to more detailed examples, but the present invention is not limited to these examples.

Example 1

As shown in FIG. 2, first, the stock solutions for forming the dielectric thin film 8 shown in FIG. 1A were prepared. In this example, the solutions shown below were prepared for making the dielectric thin film 8 a bismuth layered compound expressed by the stoichiochemical formula $Bi_{4-x}La_xTi_3O_{12}$.

First, bismuth 2-ethylhexanoate in a 2-ethylhexanoic acid solution and titanium 2-ethylhexanoate and lanthanum 2-ethylhexanoate in a toluene solution were prepared.

Next, the bismuth 2-ethylhexanoate in an amount of 4−x moles, the titanium 2-ethylhexanoate in an amount of 3 moles, and the lanthanum 2-ethylhexanoate in an amount of x (x=0, 1.0, 1.1, 1.25, 1.5, and 2.0) moles were mixed to obtain several types of mixed solutions. Note that bismuth 2-ethylhexanoate was added in 10 to 20 mol % excess with respect to the amount of moles when using the stoichiochemical ratio for mixture.

Next, the mixed solutions were diluted by toluene to, converted to $Bi_{4-x}La_xTi_3O_{12}$, 0.1 mol/l to prepare stock solutions. These stock solutions were filtered into glass containers washed in a clean room by PTFE syringe filters with pore sizes of 0.2 µm in clean booths.

Further, separate from the stock solutions, substrates 4 for forming the dielectric thin films 8 were prepared. The substrates 4 were silicon single crystal (100) substrates. The substrates 4 were formed on their surfaces with insulation layers 5 comprised of silicon oxide films by thermal oxidation. The insulation layers 5 had thicknesses of 0.5 µm. The insulation layers 5 were formed on their surfaces with lower portion electrodes 6 made of Pt thin films by sputtering to 0.1 µm thicknesses. The substrates 4 had areas of 5 mm×10 mm.

A number of the substrates 4 corresponding to the types of the stock solutions were prepared. These were set in spin coaters which were used to spin coat the surfaces of the lower portion electrodes 6 of the substrates 4 with the stock solutions in amounts of about 10 µl under conditions of a speed of 4000 rpm for 20 seconds and thereby form coated films on the surfaces of the lower portion electrodes 6. The substrates 4 were placed in constant temperature tanks set to 150° C. (insides filled with air) for evaporating the solvents of these coated films and dried for 10 minutes. After 10 minutes, the substrates 4 were taken out and, as shown in FIG. 1A, parts of the surfaces of the lower portion electrodes 6 were exposed by wiping away parts of the coated films for forming the dielectric thin films 8.

Next, to calcine the coated films, the substrates 4 were placed in a ring-shaped furnace. Oxygen was blown into this ring-shaped furnace at 0.3 liter/minute. The temperature was raised at a temperature elevation rate of 10 K/minute to 400° C., held at 400° C. for 10 minutes, then lowered at a temperature lowering rate of 10 K/minute. The calcining was conducted under temperature conditions not causing the coated film to crystallize.

After this, the calcined coated films were again subjected to the process from spin coating to calcining using the same type of stock solutions.

Next, to fire the calcined films, the substrates were placed in a ring-shaped furnace. Oxygen was blown into this ring-shaped furnace at 5 ml/minute. The temperature was raised at a temperature elevation rate of 80 K/minute to 860° C. or 900° C., then held at 860° C. or 900° C. for 30 minutes and then lowered at a temperature lowering rate of 80 K/minute to obtain parts of the dielectric thin films 8. The parts of the dielectric thin films 8 after fired had thicknesses of about 80 nm.

After this, the parts of the dielectric thin films 8 after fired were, as shown in FIG. 2, coated, dried, calcined, coated, dried, calcined, and fired again under the above conditions to finally obtain the dielectric thin films 8 having total thicknesses of 160 nm to 360 nm.

The inventors measured the crystal structures of the dielectric thin films 8 by X-ray diffraction (XRD) whereupon it was confirmed that the structures were oriented in the [001] direction, that is, the silicon single crystals had c-axes oriented substantially vertical to the surfaces of the substrates 4.

Next, the dielectric thin films 8, as shown in FIG. 1B, were formed with 0.1 mmφ Pt upper portion electrodes 10 by sputtering to prepare thin film Capacitor Samples 1 to 7 differing in the value of x (amount of La), the amount of excess of bismuth, and the firing temperature. Table 1 shows the values of x (amounts of La), the amounts of excess of bismuth, and the firing temperatures of Capacitor Samples 1 to 7. Note that in this example, the firing temperature and the amount of excess of bismuth were suitably adjusted in accordance with the content of the rare earth element.

TABLE 1

| Sample no. | | x | Bi excess (mol %) | Firing temperature (° C.) |
|---|---|---|---|---|
| 1 | Comp. ex. | 0.00 | 10 | 860 |
| 2 | Comp. ex. | 0.50 | 10 | 860 |
| 3 | Comp. ex. | 1.00 | 10 | 900 |
| 4 | Comp. ex. | 1.10 | 20 | 900 |
| 5 | Ex. | 1.25 | 20 | 900 |
| 6 | Ex. | 1.50 | 20 | 900 |
| 7 | Ex. | 2.00 | 20 | 900 |

The obtained capacitor samples were evaluated for temperature characteristics and electrical characteristics at room temperature. The temperature characteristics were evaluated by measuring the rate of change of the electrostatic capacitance (temperature dependency of electrostatic capacitance). The electrical characteristics at room temperature were evaluated by measuring the dielectric loss tan δ, field dependency, and frequency dependency.

Rate of Change of Electrostatic Capacitance (Temperature Dependency of Electrostatic Capacitance)

Figure 4:
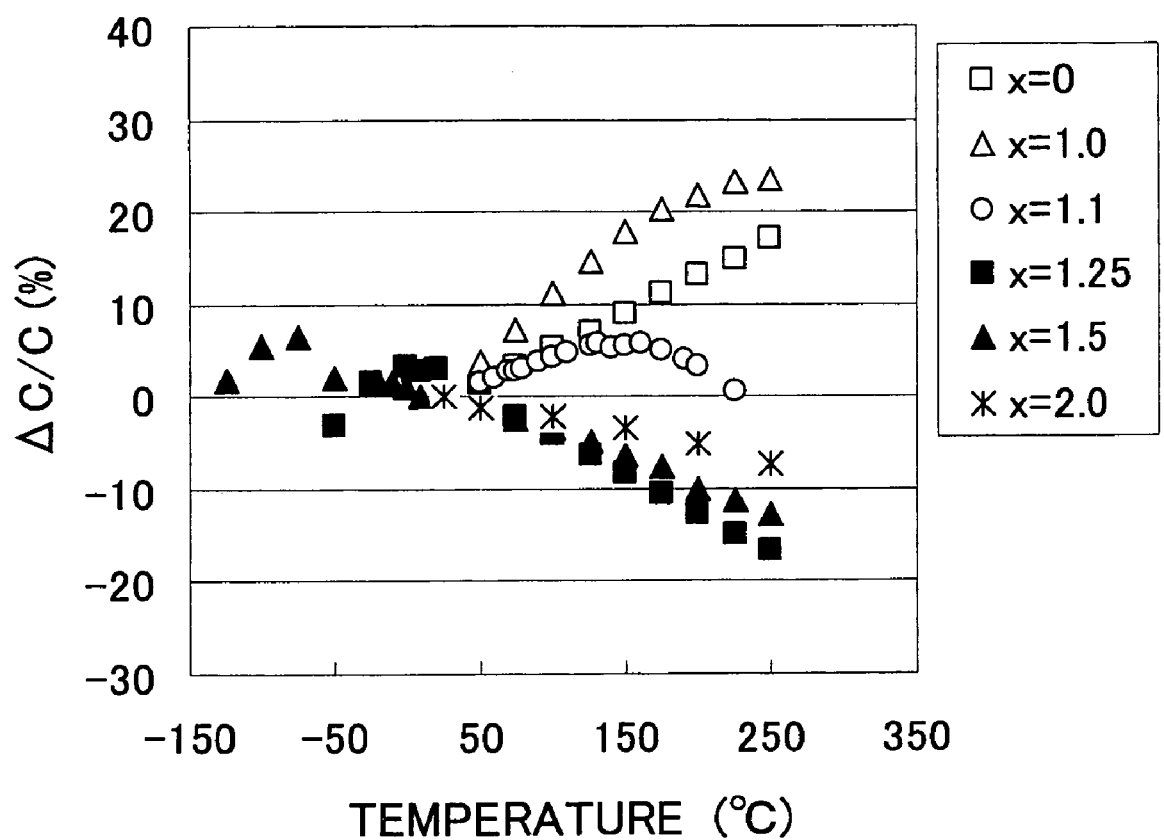
FIG. 4 is a graph showing the relationship between the measurement temperature and the rate of change ΔC/C of the capacitance in a dielectric thin film of a thin film capacitor according to Example 1 of the present invention.

First, the capacitor samples were measured for electrostatic capacitance C using an impedance analyzer (HP4194A) in a −125° C. to +250° C. temperature range under conditions of a measurement frequency of 1 kHz (AC 20 mV). Next, the ratios (%) of the electrostatic capacitances C at the different measurement temperatures with respect to the electrostatic capacitance at 25° C. ($C_{25° C.}$) were calculated and were used as the rates of change of the electrostatic capacitance. That is, the rates of change of the electrostatic capacitance ΔC/C were found by $\Delta C/C(\%) = \{(C - C_{25° C.})/C_{25° C.}\} \times 100$. A graph showing the relationship between the measurement temperature and the rate of change of the electrostatic capacitance ΔC/C is shown in FIG. 4.

Note that when measuring the temperature characteristics, a temperature adjustment prober comprised of REL-3200 (made by Cascade Microtech) was used for measurement at room temperature or more and one comprised of SPI3800 and SPA300HV (both made by SII) was used for measurement at room temperature or less.

Dielectric Loss tan δ

The capacitor samples were measured for dielectric loss tan δ (unit %) using an impedance analyzer (HP4194A) under conditions of room temperature (25° C.) and a measurement frequency of 1 kHz (AC 20 mV). The results are shown in Table 2 and FIG. 6.

Field Dependency of Electrostatic Capacitance and Frequency Dependency of Electrostatic Capacitance The field dependency (%) of the electrostatic capacitance was determined for each capacitor sample by using an impedance analyzer (HP4194A) under conditions of room temperature (25° C.) and a measurement frequency of 1 kHz (AC 20 mV) to measure the electrostatic capacitance ($C_{0\,kV/cm}$) when the DC bias was 0 kV/cm and the electrostatic capacitance ($C_{100\,kV/cm}$) when the DC bias was 100 kV/cm and calculating $\Delta C/C(\%) = 100 \times (C_{100\,kV/cm} - C_{0\,kV/cm})/C_{0\,kV/cm}$. The field dependency (%) of the electrostatic capacitance is an indicator showing the bias characteristics of a capacitor sample. One close to 0% is preferable. The results are shown in Table 2 and FIG. 7.

The frequency dependency (%) of the electrostatic capacitance was determined for each capacitor sample by using an impedance analyzer (HP4194A) at room temperature (25° C.) and a DC bias of 0 kV/cm to measure the electrostatic capacitance ($C_{1\,kHz}$) when the measurement frequency was 1 kHz and the electrostatic capacitance ($C_{1\,MHz}$) when the measurement frequency was 1 MHz and calculating $\Delta C/C(\%) = 100 \times (C_{1\,MHz} - C_{1\,kHz})/C_{1\,kHz}$. The frequency dependency (%) of the electrostatic capacitance is an indicator showing the frequency characteristic of a capacitor samples. One close to 0% is preferable. The results are shown in Table 2 and FIG. 7.

Evaluation 1

FIG. 4 is a graph showing the rate of change of the electrostatic capacitance (temperature dependency of electrostatic capacitance) ΔC/C in the temperature ranges. The samples where x=1.1 to 2.0 in the value of x (amount of La) are small in the rate of change of the electrostatic capacitance ΔC/C in the ranges of measurement temperature, i.e., are good. On the other hand, the samples where x=0 and 1.0 tended to have large rates of change of the electrostatic capacitance ΔC/C.

Further, the sample where x=1.5 had a peak of the rate of change of the electrostatic capacitance near −75° C. to −100° C. The sample where x=1.25 also had a peak of the rate of change of the electrostatic capacitance near 0° C. to +20° C. Both samples had Curie points of room temperature or less.

Note that the sample where x=1.1 had a peaks of the rate of change of the electrostatic capacitance near +125° C. to +175° C., while the sample where x=1.0 had a peak of the rate of change of the electrostatic capacitance near 225° C. to 250° C.

Figure 5:
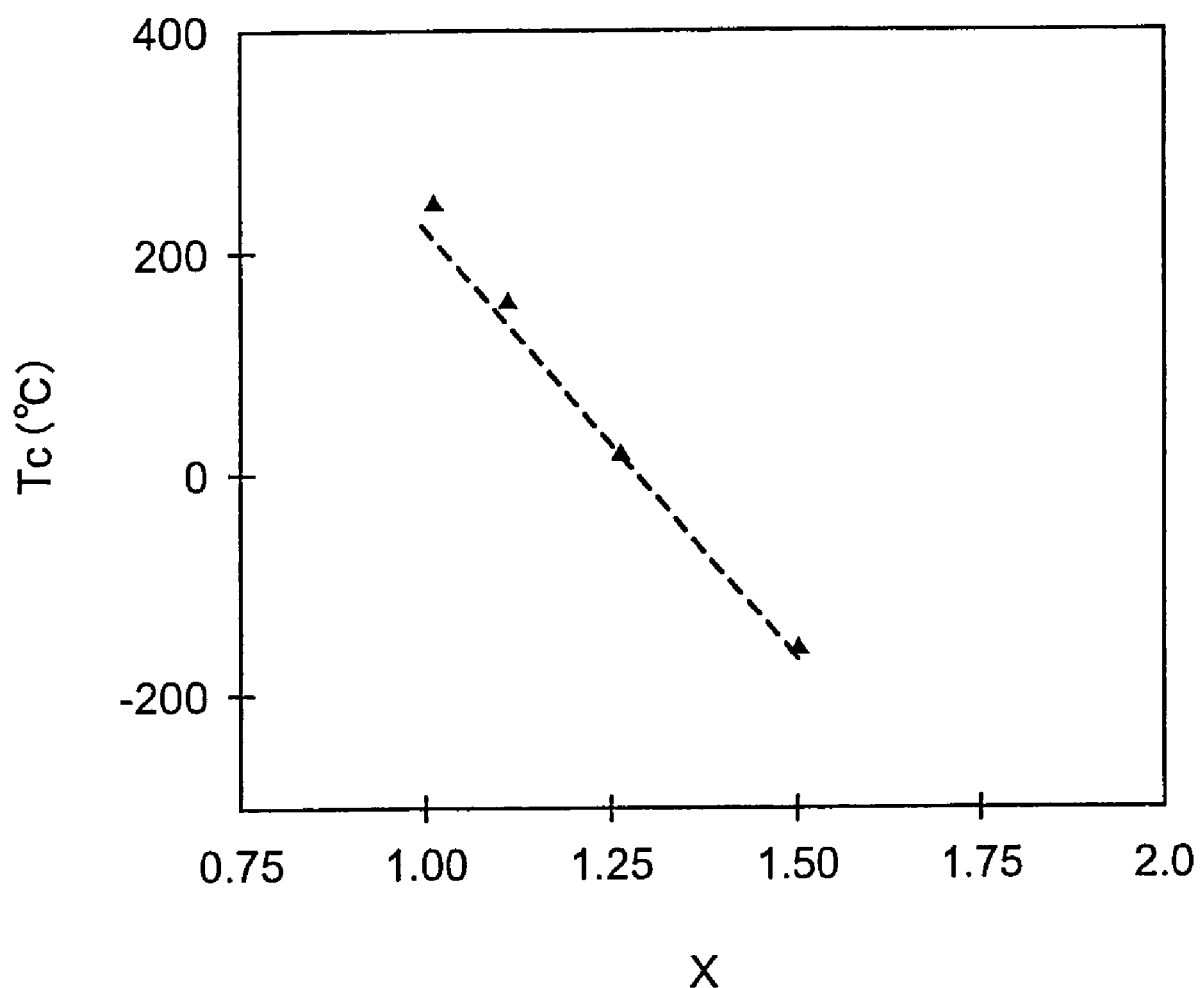
FIG. 5 is a graph showing the relationship between a value of x (amount of La) and the Curie point in a dielectric thin film of a thin film capacitor according to Example 1 of the present invention.

FIG. 5 shows the Curie points of samples where x=1.0, 1.1, 1.25, and 1.5. From FIG. 5, it could be confirmed that if the value of x (amount of La) increases, the Curie point tends to become lower. Note that Curie point was judged by the peak position of the rate of change of the electrostatic capacitance $\Delta C/C$ (the temperature when the rate of change of the electrostatic capacitance exhibits its maximal value).

The sample where x=2.0 could not be confirmed as to the peak of the rate of change of the electrostatic capacitance in the range of measurement temperature of this example. However, from the fact that the samples where x=1.0 to 1.5 had Curie points which tended to fall when the value of x (amount of La) increased and the fact that in the samples where x=1.25 and 1.5 the Curie points were room temperature or less, it is believed that the sample where x=2.0 had a Curie point of room temperature or less. Further, the sample where x=0 also could not be confirmed as to the peak of the rate of change of the electrostatic capacitance in the range of measurement temperature of this example, but from the above results, the Curie point is believed to be a temperature higher than the 250° C. upper limit of the measurement range of the example.

Figure 7:
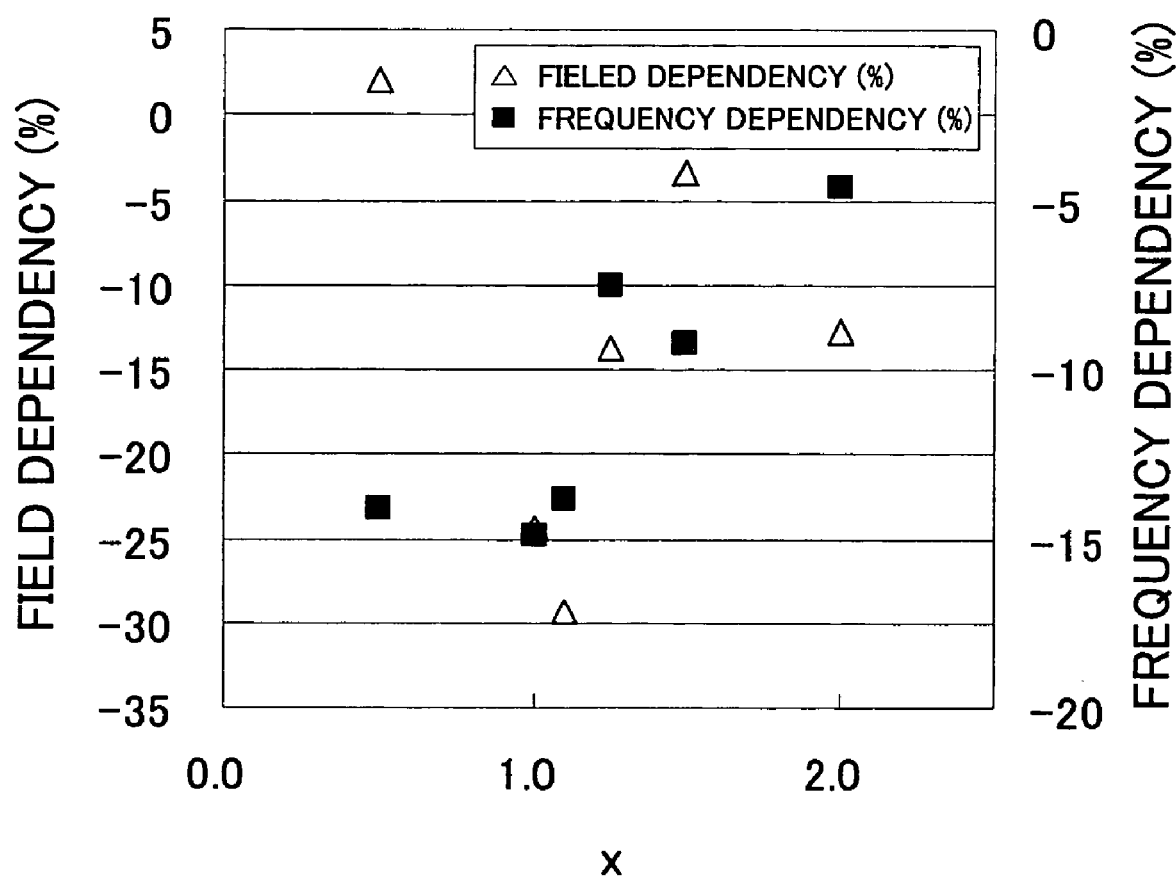
FIG. 7 is a graph showing the relationship between a value of x (amount of La) and a field dependency and frequency dependency in a dielectric thin film of a thin film capacitor according to Example 1 of the present invention.

From the results, it can be confirmed that if increasing the amount of addition of lanthanum, the thin film capacitor element composition can be lowered in the Curie point and that to lower the Curie point, the value of x (amount of La) is preferably made x>1. In particular, in this example, it could be confirmed that by making the value of x (amount of La) more preferably x≧1.25, the Curie point of the thin film capacitor element composition could be made room temperature or less and that the composition could be made paraelectric at room temperature.

small. Note that FIG. 7 is a graph showing the relationship between the value of x (amount of La) and the field dependency and frequency dependency.

From the results, it can be confirmed that if the value of x (amount of La) increases, the dielectric loss, frequency characteristic, and bias characteristic are improved. The value of x is preferably 1<x≦2.8, more preferably 1.1≦x≦2.5, furthermore preferably 1.25≦x≦2.4.

Further, the dielectric thin films of the Capacitor Samples 4 to 7 of this example were formed by the method of production of the present invention, so even when making the value of x (amount of La) of the thin film capacitor element composition x>1, good dielectric thin films having superior electrical characteristic could be obtained.

Example 2

Except for making the dielectric thin films 8 by bismuth layered compounds expressed by the stoichiochemical formula $(Bi_2O_2)^{2+}(Sr_2(Bi_{2-x}La_x)Ti_5O_{16})^{2-}$ and making the firing temperature 850 to 960° C., the same procedure was followed as in Example 1 to prepare thin film Capacitor Sample 8 to 11 differing in the value of x (amount of La), the amount of excess of bismuth, and firing temperature as shown in Table 3.

Note that in this example, the method shown below was used to prepare the stock solutions and these stock solutions were used to form the dielectric thin films 8.

At the time of preparation of the stock solutions, first bismuth 2-ethylhexanoate in a 2-ethylhexanoic acid solution and strontium 2-ethylhexanoate, titanium 2-ethylhexanoate, and lanthanum 2-ethylhexanoate in a toluene solution were prepared.

Next, bismuth 2-ethylhexanoate in an amount of 4−x moles, strontium 2-ethylhexanoate in an amount of 2 moles, titanium 2-ethylhexanoate in an amount of 5 moles, and lan-

TABLE 2

| Sample no. | | x | Bi excess (mol %) | Firing temperature (° C.) | $\epsilon$ | tan δ (%) | Field dependency $\Delta$ C/C (%) | Frequency dependency $\Delta$ C/C (%) |
|---|---|---|---|---|---|---|---|---|
| 2 | Comp. ex. | 0.50 | 10 | 860 | 143.80 | 7.96 | 2.00 | −14.09 |
| 3 | Comp. ex. | 1.00 | 10 | 900 | 220.66 | 9.22 | −24.31 | −14.92 |
| 4 | Ex. | 1.10 | 20 | 900 | 256.25 | 8.46 | −29.29 | −13.81 |
| 5 | Ex. | 1.25 | 20 | 900 | 263.52 | 4.13 | −13.79 | −7.51 |
| 6 | Ex. | 1.50 | 20 | 900 | 124.31 | 5.22 | −3.38 | −9.25 |
| 7 | Ex. | 2.00 | 20 | 900 | 133.80 | 2.52 | −12.68 | −4.63 |

Evaluation 2

Table 2 shows the value of x (amount of La), the amount of excess of bismuth, the firing temperature, and the measurement results of the dielectric loss tan δ and the field dependency and frequency dependency of each of the capacitor samples.

Figure 6:
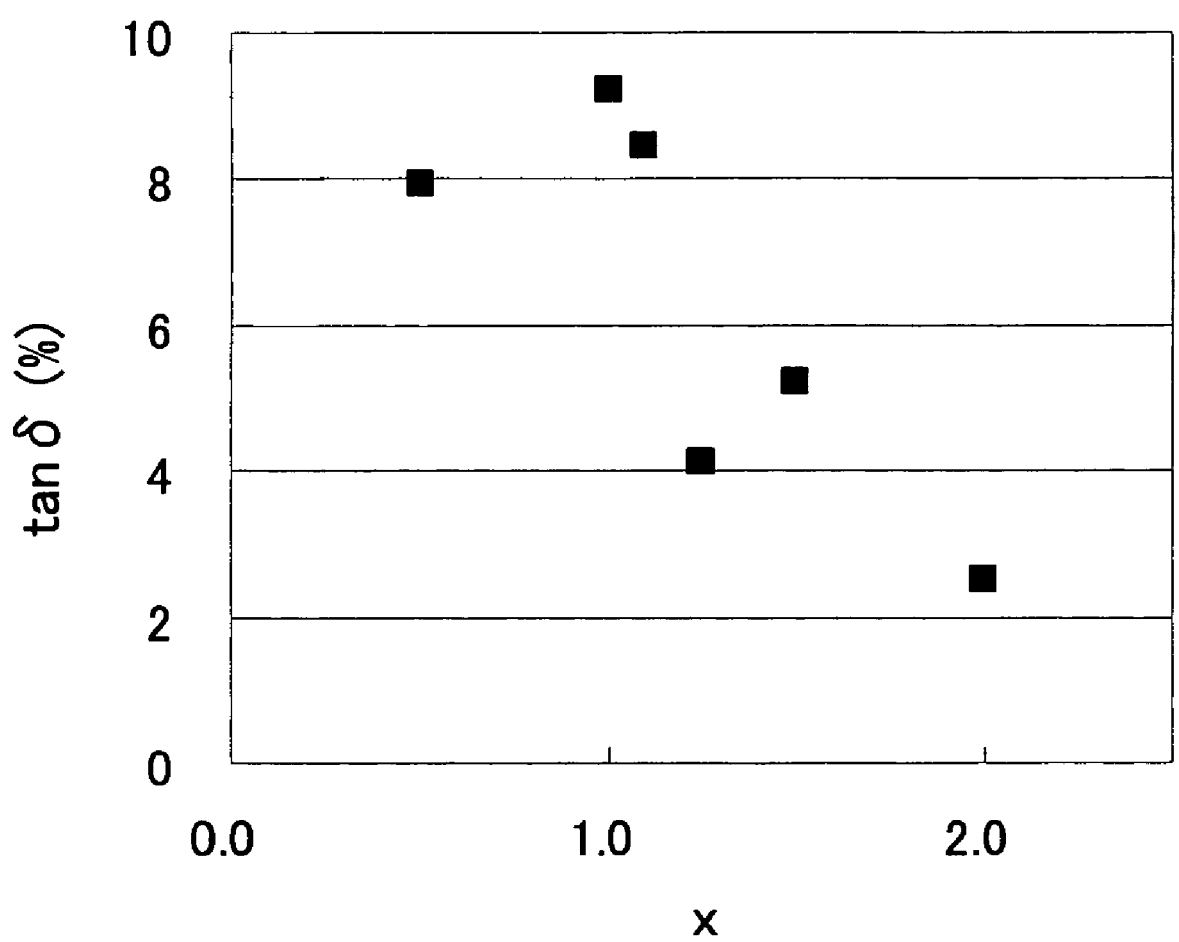
FIG. 6 is a graph showing the relationship between a value of x (amount of La) and the dielectric loss in a dielectric thin film of a thin film capacitor according to Example 1 of the present invention.

From Table 2 and FIG. 6, it could be confirmed that if the value of x (amount of La) is increased, the dielectric loss tan δ tends to be improved. Note that FIG. 6 is a graph showing the relationship between the value of x (amount of La) and the dielectric loss tan δ.

Further, from Table 2 and FIG. 7, it could be confirmed that if the value of x (amount of La) increases, the field dependency and frequency dependency of the electrostatic capacitance both approached 0% and therefore tended to become thanum 2-ethylhexanoate in an amount of x (x=0, 1.0, 1.5, and 2.0) moles were mixed to obtain several types of mixed solutions. Note that the bismuth 2-ethylhexanoate was added in 10 to 20 mol % excess with respect to the amount of moles when using the stoichiochemical ratio for mixture. Next, the mixed solutions were diluted by toluene to, converted to $(Bi_2O_2)^{2+}(Sr_2(Bi_{2-x}La_x)Ti_5O_{16})^{2-}$, 0.1 mol/l and were filtered into glass containers washed in a clean room by PTFE syringe filters with pore sizes of 0.2 μm in clean booths to thereby prepare the stock solutions.

Table 3 shows the values of x (amounts of La), the amounts of excess of bismuth, and the firing temperatures of Capacitor Samples 8 to 11 of this example. Note that in this example, the firing temperature and the amount of excess of bismuth were suitably adjusted in accordance with the content of the rare earth element.

TABLE 3

| Sample no. | | x | Bi excess (mol %) | Firing temperature (° C.) |
|---|---|---|---|---|
| 8 | Comp. ex. | 0 | 10 | 850 |
| 9 | Comp. ex. | 1.0 | 20 | 940 |
| 10 | Ex. | 1.5 | 20 | 960 |
| 11 | Ex. | 2.0 | 20 | 960 |

TABLE 4

| Sample no. | | x | Bi excess (mol %) | Firing temperature (° C.) | ε | tan δ (%) | Field dependency Δ C/C (%) | Frequency dependency Δ C/C (%) |
|---|---|---|---|---|---|---|---|---|
| 8 | Comp. ex. | 0 | 10 | 850 | 197.2 | 0.734 | −11.56 | −6.35 |
| 9 | Comp. ex. | 1.0 | 20 | 940 | 178.1 | 5.641 | −16.49 | −16.62 |
| 10 | Ex. | 1.5 | 20 | 960 | 161.82 | 0.277 | −1.86 | −1.3 |
| 11 | Ex. | 2.0 | 20 | 960 | 134.11 | 0.143 | −0.17 | −0.19 |

The Capacitor Samples 8 to 11 of this example, in the same way as Example 1, were measured for the rate of change of the electrostatic capacitance (temperature dependency of electrostatic capacitance) and the dielectric loss tan δ, field dependency, and frequency dependency at room temperature.

Evaluation 3

Figure 8:
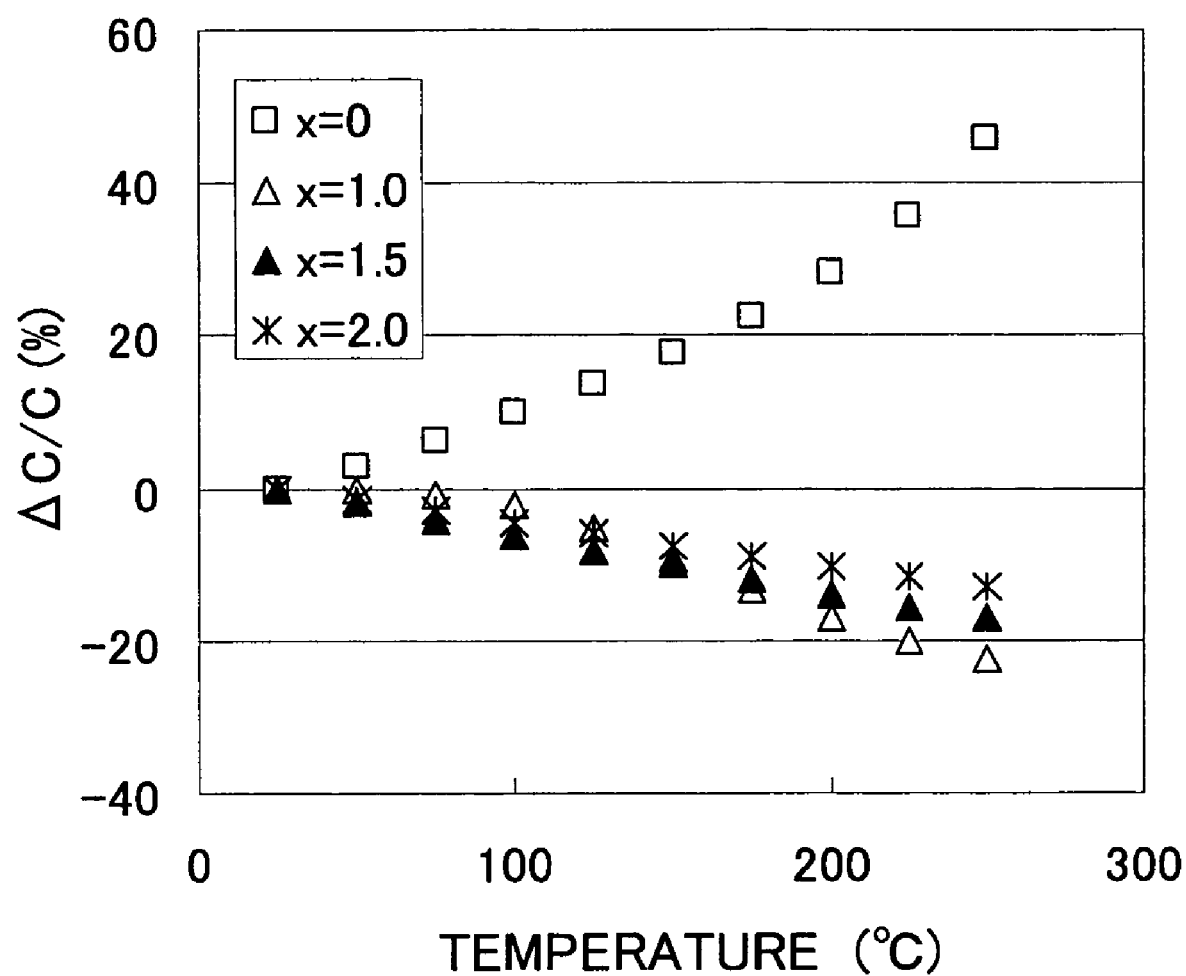
FIG. 8 is a graph showing the relationship between a measurement temperature and a rate of change ΔC/C of the capacitance in a dielectric thin film of a thin film capacitor according to Example 2 of the present invention.

FIG. 8 is a graph showing the rate of change of the electrostatic capacitance (temperature dependency of electrostatic capacitance) ΔC/C in the temperature range of the capacitor samples of this example. From FIG. 8, it could be confirmed that the samples where x=1.5 and 2.0 are small in the rate of change of the electrostatic capacitance ΔC/C in the range of measurement temperature of this example and low in the temperature dependency of the electrostatic capacitance. On the other hand, the samples where x=0 and 1.0 had large rates of change of the electrostatic capacitance ΔC/C and high temperature dependencies of the electrostatic capacitance.

Note that the sample where x=1.0 had a peak of the rate of change of the electrostatic capacitance near 50° C., that is, a Curie point near 50° C. Further, the sample where x=0 could not be confirmed as to the peak of the rate of change of the electrostatic capacitance in the measurement range of this example, but it could be confirmed that if the measurement temperature rose, the rate of change of the electrostatic capacitance also tended to become larger. From the results, the sample where x=0 probably had a Curie point of above the 250° C. upper limit of the measurement range of this example.

The sample where x=1.5 and the sample where x=2.0 could not be confirmed as to the peak of the rate of change of the electrostatic capacitance, that is, the Curie point, in the range of measurement temperature of this example. However, from the fact that the sample where x=1.0 had a Curie point near 50° C. and the measurement results of the rate of change of the electrostatic capacitance of Example 1, it is believed that the samples where x=1.5 and 2.0 had Curie points of temperatures less than the lower limit of 25° C., that is, room temperature or less.

From the results, in this example as well, in the same way as Example 1, it can be confirmed that if increasing the amount of addition of lanthanum, the thin film capacitor element composition can be lowered in the Curie point and that to lower the Curie point, the value of x (amount of La) is preferably made x>1. In particular, in this example, it could be confirmed that by making the value of x (amount of La) more preferably x≧1.5, the Curie point of the thin film capacitor element composition could be made room temperature or less and that the composition could be made paraelectric at room temperature.

Evaluation 4

Table 4 shows the value of x (amount of La), the amount of excess of bismuth, the firing temperature, and the measurement results of the dielectric loss tan δ and the field dependency and frequency dependency of each of the Capacitor Samples 8 to 11.

Figure 9:
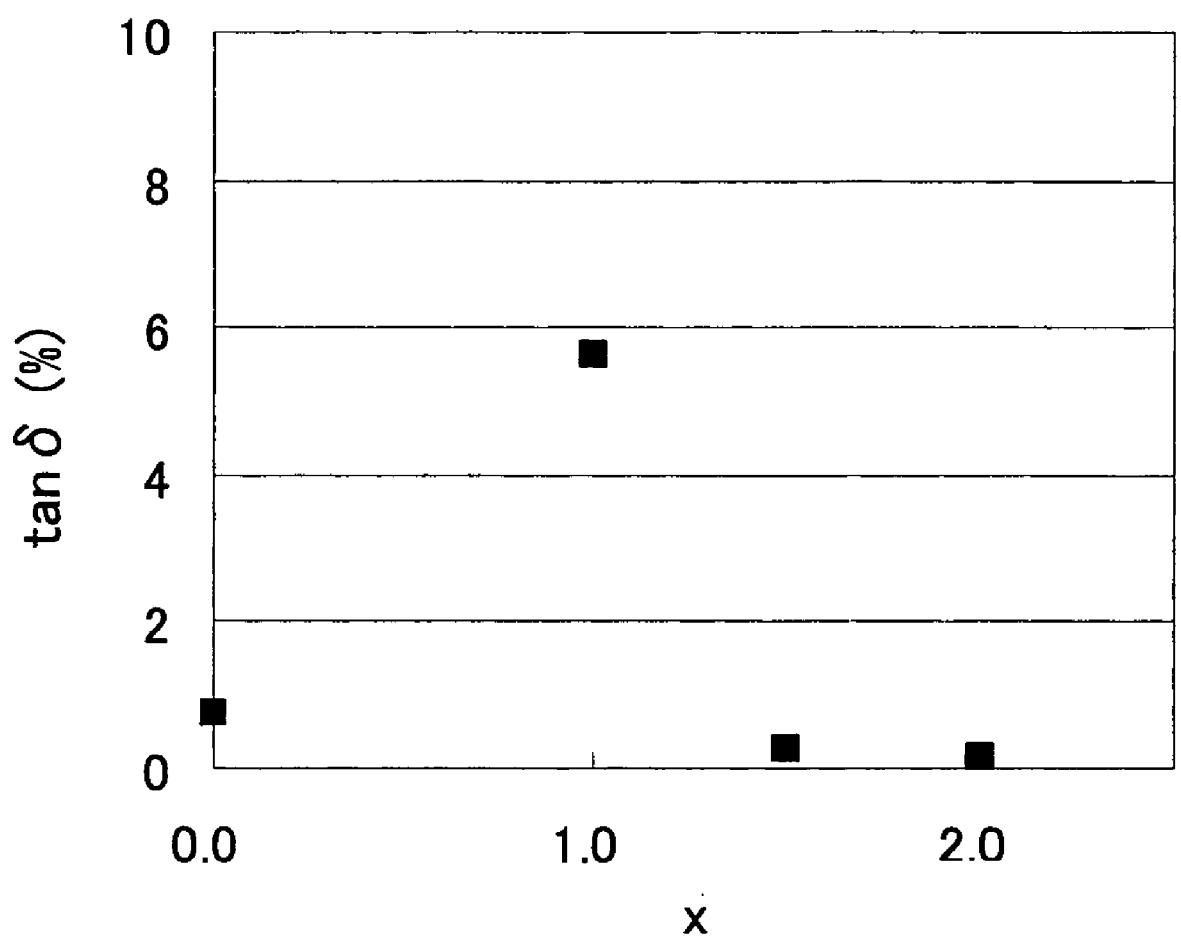
FIG. 9 is a graph showing the relationship between a value of x (amount of La) and a dielectric loss in a dielectric thin film of a thin film capacitor according to Example 2 of the present invention.

From Table 4 and FIG. 9, Samples 10 and 11 where the values of x (amounts of La) were made x=1.5 and 2.0 had dielectric losses tan δ of 0.277% and 0.143%, that is, good results. On the other hand, Sample 9 where x=1.0 had a dielectric loss tan δ of a high 5.641%.

Figure 10:
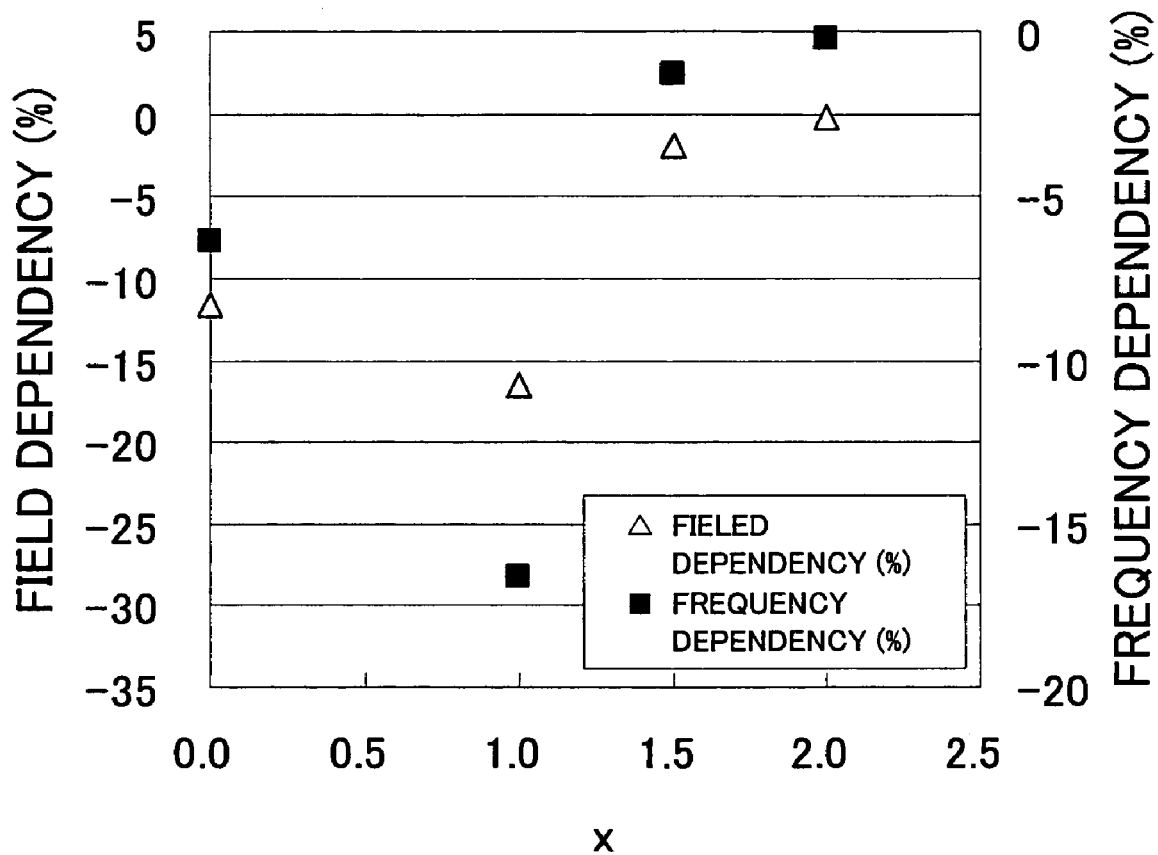
FIG. 10 is a graph showing the relationship between a value of x (amount of La) and a field dependency and frequency dependency in a dielectric thin film of a thin film capacitor according to Example 2 of the present invention.

Further, from Table 4 and FIG. 10, Samples 10 and 11 where the values of x (amounts of La) were made x=1.5 and 2.0 had field dependencies and frequency dependencies of the electrostatic capacitance of values close to 0%, that is, good results. On the other hand, Samples 8 and 9 where the values of x (amounts of La) were made x=0 and 1.0 had field dependencies of −10% or less and frequency dependencies of −6% or less, that is, both the frequency characteristics and bias characteristics tended to deteriorate.

From the results, it could be confirmed that by making the value of x (amount of La) preferably 1<x≦2.8, more preferably 1.1≦x≦2.5, furthermore preferably 1.25≦x≦2.4, the dielectric loss, frequency characteristic, and bias characteristic are improved.

Note that the dielectric thin films of the Capacitor Samples 10 to 11 of this example, like in Example 1, were formed by the method of production of the present invention, so even when making the value of x (amount of La) of the thin film capacitor element composition x>1, good dielectric thin films having superior electrical characteristic could be obtained.

The invention claimed is:

1. A thin film capacitor element composition having a bismuth layered compound with a c-axis being oriented in a direction substantially vertical to a substrate surface, wherein
said bismuth layered compound is expressed by the formula $(Bi_2O_2)^{2+}(A_{m-1}B_mO_{3m+1})^{2-}$ or $Bi_2A_{m-1}B_mO_{3m+3}$, wherein a symbol m indicates an odd number, a symbol A indicates at least one element selected from Na, K, Pb, Ba, Sr, Ca, and Bi, and a symbol B indicates at least one element selected from Fe, Co, Cr, Ga, Ti, Nb, Ta, Sb, V, Mo, and W, at least part of the Bi and/or A of said bismuth layered compound is substituted by a rare earth element (at least one element selected from Sc, Y, La, Ce, Pr, Nd, Pm, Sm, Eu, Gd, Tb, Dy, Ho, Er, Tm, Yb, and Lu), and the number of moles substituted by said rare earth element with respect to the number of moles (m+1) of the total of Bi and A is larger than 1.0 and 2.8 or less.

2. The thin film capacitor element composition as set forth in claim 1, wherein the Bi of said bismuth layered compound is contained in excess with respect to said formula $(Bi_2O_2)^{2-}(A_{m-1}B_mO_{3m+1})^{2-}$ or $Bi_2A_{m-1}B_2O_{3m+3}$ and an excess content of the Bi, converted to Bi, is $0<Bi<0.6\times m$ moles in range.

3. The thin film capacitor element composition as set forth in claim 1, wherein the symbol m in said formula is m=3.

4. The thin film capacitor element composition as set forth in claim 3, wherein when said rare earth element is Re and said bismuth layered compound is expressed as $Bi_{4-x}Re_xTi_3O_{12}$, said x is $1<x\leq2.8$.

5. The thin film capacitor element composition as set forth in claim 1, wherein the symbol m in said formula is m=5.

6. The thin film capacitor element composition as set forth in claim 5, wherein the rare earth element is Re and said bismuth layered compound is expressed as $Bi_{4-x}A_2Re_xTi_5O_{18}$, said x is $1<x\leq2.8$.

7. The thin film capacitor element composition as set forth in claim 1, wherein said rare earth element is at least one element selected from La, Ce, Pr, Nd, Pm, Sm, Eu, and Gd.

8. A thin film capacitor element comprised of a substrate on which a lower portion electrode, dielectric thin film, and upper portion electrode are successively formed, wherein said dielectric thin film is comprised of the thin film capacitor element composition of claim 1.

9. The thin film capacitor element as set forth in claim 8, wherein said dielectric thin film has a thickness of 1 to 1000 nm.

10. A method of production of the thin film capacitor element as set forth in claim 8, said method of production of the thin film capacitor element comprising a coating step of coating a solution for forming said thin film capacitor element composition on the surface of said lower portion electrode to form a coated film when forming said dielectric thin film on said lower portion electrode and a firing step of firing the coated film on said lower portion electrode to obtain a dielectric thin film.

11. The method of production of the thin film capacitor element as set forth in claim 10, wherein after forming said coated film on a surface of said lower portion electrode, said coated film is dried, then, calcining is performed on said coating film at a temperature of not crystallizing the coated film and, then, said coated film is fired.

12. The method of production of the thin film capacitor element as set forth in claim 11, wherein the temperature for drying said coated film is room temperature to 400° C.

13. The method of production of the thin film capacitor element as set forth in claim 11, wherein the temperature for calcining said coated film is 200 to 700° C.

14. The method of production of the thin film capacitor element as set forth in claim 10, wherein after drying said coated film, steps of forming still another coated film on the dried coated film and drying the coated film are repeated to obtain a coated film having a desired thickness and, then, the coated film is fired.

15. The method of production of the thin film capacitor element as set forth in claim 10, wherein after drying and performing calcining on said coated film, steps of forming still another coated film on the calcined coated film and drying and performing calcining on the coated film are repeated to obtain a coated film having a desired thickness and, then, the coated film is fired.

16. The method of production of the thin film capacitor element as set forth in claim 10, wherein steps of drying said coated film, performing calcining and, then, firing are repeated to obtain a coated film having a desired thickness.

17. The method of production of the thin film capacitor element as set forth in claim 10, wherein the temperature for firing said coated film is the 500 to 1000° C. crystallization temperature of said coated film.

18. The method of production of the thin film capacitor element as set forth in claim 10, further comprising repeating the coating, drying, and/or calcining so that the thickness of the not yet fired coated film before firing becomes 200 nm or less.

19. The method of production of the thin film capacitor element as set forth in claim 10, further comprising forming said dielectric thin film, then forming an upper portion electrode on said dielectric thin film, then heat treating the assembly in the air or in an oxygen atmosphere.

20. A thin film multilayer capacitor comprised of a substrate on which a dielectric thin film and internal electrode thin film are alternately stacked in a plurality of layers, wherein said dielectric thin film is comprised of the thin film capacitor element composition claim 1.

21. The thin film multilayer capacitor as set forth in claim 20, wherein said dielectric thin film has a thickness of 1 to 1000 nm.

22. A high permittivity insulation film having a bismuth layered compound with a c-axis being oriented in a direction substantially vertical to a substrate surface, wherein the bismuth layered compound is comprised of a thin film capacitor element composition of claim 1.

* * * * *